C. LEAVITT.
Combined Sod-Cutters and Land-Rollers.

No. 135,719. Patented Feb. 11, 1873.

Witnesses.
A. F. Cornell.
F. H. Penfield.

Inventor.
Charles Leavitt,
Per Burridge & Co.
Attys.

AM. PHOTO-LITHOGRAPHIC CO. N.Y. (OSBORNE'S PROCESS)

UNITED STATES PATENT OFFICE.

CHARLES LEAVITT, OF CLEVELAND, OHIO.

IMPROVEMENT IN COMBINED SOD-CUTTERS AND LAND-ROLLERS.

Specification forming part of Letters Patent No. 135,719, dated February 11, 1873.

*To all whom it may concern:*

Be it known that I, CHARLES LEAVITT, of Cleveland, in the county of Cuyahoga and State of Ohio, have invented a certain new and Improved Sod-Cutter and Land-Roller Combined; and I do hereby declare that the following is a full, clear, and complete description thereof, reference being had to the accompanying drawing making part of the same.

Figure 1:
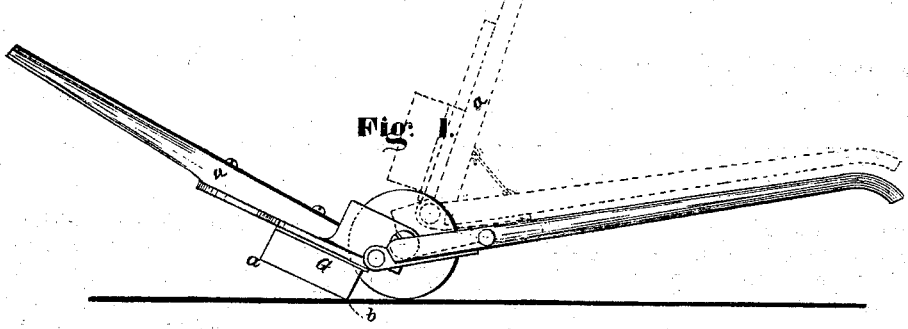
Figure 2:
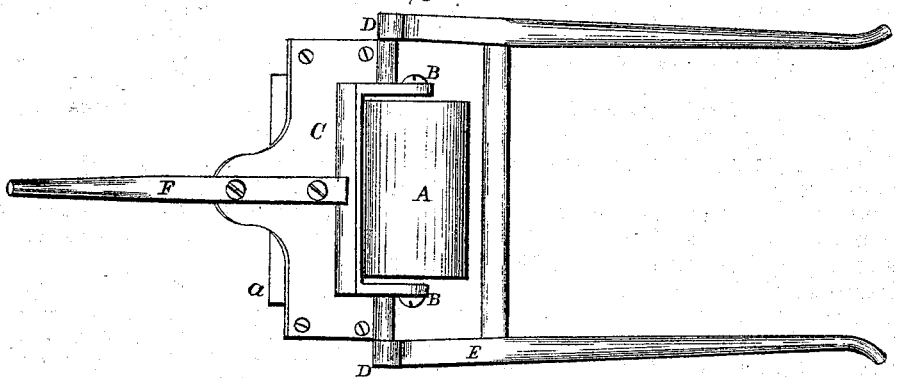
Figure 3:
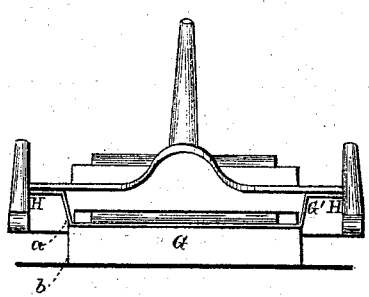

Figure 1 is a side elevation of the sod-plow and land-roller combined. Fig. 2 is a plan view. Fig. 3 is an end view.

Like letters of reference refer to like parts in the several views.

The special purpose of this machine is for cutting sod for relaying, but which, however, can be used independently of the cutting device for a land-roller.

The construction and mode of operation of the above-said machine are as follows:

In the drawing, Fig. 2, A represents a roller, having its bearings at B in the frame C. To said frame is also hinged at D a pair of thills or shafts, E, whereby the machine is drawn. Said machine is guided in its course by a handle, F. To the under side of the frame C is secured a cutter, G, Figs. 1 and 2. Said cutter consists of a broad plate provided with two cutting-edges, $a\,b$, Fig. 1, the basil of which is on the upper side, so as to cause the cutter to draw into the ground for cutting under the sod. Each end of the plate is turned upward nearly at a right angle, as shown in Fig. 3. The edges of the upturned ends are also brought to a cutting-edge. The relative position of the cutter to the roller is such as shown in the drawing, in which it will be seen that the cutting-edge $b$ is near the face of the roller, and parallel therewith, but somewhat longer, and that the cutting ends are nearly vertical, as above-said.

The practical operation of the above-described machine is as follows: The horse is geared into the thills E; the operator takes his place behind, holding the handle for directing its course. As the team moves forward the cutter or blade cuts down into and under the turf, and shaves it off from the ground in long strips, which pass over or through the cutter and fall upon the ground, which can then be readily rolled up for removal.

The basil of the cutting-edge being on the upper side, there is, in consequence, no trouble in keeping the cutter under the turf. The sides of the cutter being made a little flaring allow the turf to slide freely over the blade, and, the two sides having a sharp cutting-edge; therefore a clean and unbroken strip of sod is cut, which can be of any desirable length and of any proper thickness.

This implement when not required for cutting sod, the blade or cutting device can be turned up, as indicated by the dotted lines $a$, and the machine then used as a roller, for the purpose specified.

Sods of different thickness can be cut by adjusting the blade in its distance from the frame to which it is secured, and which may be done by inserting fillets between the flanges H of the cutter and the frame, thereby furring out the blade.

In providing the blade with two cutting-edges, when one edge has become dull and worn the cutter can be reversed, thereby bringing the sharp rear edge to the front.

Claim.

What I claim as my invention, and desire to secure by Letters Patent, is—

The cutting device or blade G, having upturned ends G', with sharp cutting-edges, as arranged in combination with the frame C and roller A, in the manner as and for the purpose set forth.

CHARLES LEAVITT.

Witnesses:
W. H. BURRIDGE,
S. LAMB.